United States Patent [19]

Davis

[11] Patent Number: 5,080,169

[45] Date of Patent: Jan. 14, 1992

[54] POLYSILALKYLENESILANE POLYMER USEFUL IN ENHANCED OIL RECOVERY USING CARBON DIOXIDE FLOODING

[75] Inventor: Bruce W. Davis, Fullerton, Calif.

[73] Assignee: Chevron Research and Technology Company, San Francisco, Calif.

[21] Appl. No.: 613,024

[22] Filed: Nov. 13, 1990

[51] Int. Cl.$^5$ .............................................. F21B 43/22
[52] U.S. Cl. .................................... 166/268; 166/273; 252/8.551; 252/8.554
[58] Field of Search ............ 166/268, 273, 274, 305.1; 252/8.554, 8.551

[56] References Cited

U.S. PATENT DOCUMENTS

| | | | |
|---|---|---|---|
| 4,609,043 | 9/1986 | Cullick | 166/268 |
| 4,852,651 | 8/1989 | Davis | 166/268 |
| 4,913,235 | 4/1990 | Harris et al. | 166/268 X |
| 4,989,674 | 2/1991 | Davis | 166/273 X |

*Primary Examiner*—George A. Suchfield
*Attorney, Agent, or Firm*—Edward J. Keeling; Ernest A. Schaal

[57] ABSTRACT

A polymer is disclosed that is useful in increasing the viscosity of carbon dioxide. That polymer comprises a polysilalkylenesilane polymer, preferably polydimethylsilmethylenedimethylsilane. That polymer can be used in a method for recovering oil from an underground oil-bearing earth formation penetrated by an injection well and a producing well, in which method carbon dioxide is injected into the formation to displace oil towards the producing well from which oil is produced to the surface. The viscosity of the carbon dioxide injected into the formation is increased at least three-fold by the presence of a sufficient amount of a polysilalkylenesilane polymer and a sufficient amount of a cosolvent to form a solution of the polymer in the carbon dioxide.

7 Claims, No Drawings

POLYSILALKYLENESILANE POLYMER USEFUL IN ENHANCED OIL RECOVERY USING CARBON DIOXIDE FLOODING

The present invention relates to a polysilalkylenesilane polymer useful in increasing the viscosity of carbon dioxide; to new compositions of matter comprising carbon dioxide and a viscosifying amount of a mixture of a cosolvent and that polysilalkylenesilane; and to a method of recovering oil from underground subterranean formations using those new compositions of matter.

BACKGROUND OF THE INVENTION

In newly discovered oil fields, oil usually will be recovered by the oil flowing from a producing well under the naturally occurring pressure of the fluids present in the porous reservoir rocks. That naturally occurring pressure decreases as the fluids are removed. This phase of production, called primary production, recovers perhaps 5% to 20% of the oil present in the formation.

Secondary recovery methods (e.g., waterflooding) are used to recover more of the oil. In these methods, a fluid is injected into the reservoir to drive additional oil out of the rocks. Waterflooding has limitations. Since the water is immiscible with oil, as the water displaces the oil the oil remaining in the reservoir reaches a limiting value known as "the residual oil saturation" and the oil stops flowing. There is a strong capillary action which tends to hold the oil in the interstices of the rocks. The amount of oil recovered by secondary techniques is usually from about 5% to 30% of the oil initially present.

In recent years, more attention has been directed to enhanced oil recovery or tertiary recovery methods. These tertiary recovery methods are used to recover the residual oil by overcoming the capillary forces which trap the oil during waterflooding. For example, it has been suggested to add surfactants to the flood to decrease the interfacial tension and thus allow oil droplets to move to producing wells.

Secondary or tertiary recovery of oil is also possible by the miscible fluid displacement process. A number of carbon dioxide floods have been tried in the United States. The carbon dioxide tends to dissolve in the oil, which swells with a consequent decrease in viscosity and improvement in the flow to producing wells. The carbon dioxide also extracts light hydrocarbons from the oil and this mixture of carbon dioxide and light hydrocarbons can, in some cases, reach a composition that will miscibly displace the oil.

This carbon dioxide-rich phase characteristically has a lower viscosity than the oil and tends to finger through the formation. Early carbon dioxide breakthrough is undesirable since reservoir sweep is reduced and expensive separation procedures are required to separate and recycle the carbon dioxide.

In U.S. Pat. No. 4,913,235, Harris et al. report a means of increasing viscosity for the carbon dioxide thirty-fold or more by using cosolvents, along with certain defined polymers having a solubility parameter of close to 6.85 $(cal/cc)^{\frac{1}{2}}$ [14.0 $J^{\frac{1}{2}}/cm^{3/2}$] and having electron donor groups such as ether, silyl ether, and tertiary amine. Those defined polymers include polysiloxanes and polyvinylethers.

SUMMARY OF THE INVENTION

The present invention is based on the discovery that polysilalkylenesilane is especially useful in increasing the viscosity of carbon dioxide because of that polymer's high solubility in carbon dioxide. Preferably, the polysilalkylenesilane is polydimethylsilmethylenedimethylsilane, polydimethylsilethylenedimethylsilane, or polymethylethylsilmethylenedimethylsilane.

In one embodiment of the present invention, the polysilalkylenesilane is used in a method for recovering oil from an underground oil-bearing earth formation penetrated by an injection well and a producing well. In that method, carbon dioxide is injected into the formation to displace the oil towards the producing well. The viscosity of that carbon dioxide is increased at least three-fold by the presence of a sufficient amount of the polysilalkylenesilane polymer and a sufficient amount of a cosolvent to form a solution of the polymer in the carbon dioxide. It is possible that, for some polysilalkylenesilane polymers, under some conditions of pressure and temperature, no cosolvent will be needed.

Preferably, the carbon dioxide solution comprises from 70 to 99.9 weight percent carbon dioxide; from 0.05 to 20 weight percent polymer; and from 0.05 to 30 weight percent cosolvent. The carbon dioxide solution can be prepared by forming a first solution of the polymer and the cosolvent and then mixing carbon dioxide with the first solution.

In another embodiment, the polymer is a copolymer of the monomers of polysilalkylenesilane and polydialkylsiloxane, preferably a copolymer of the monomers of polydimethylsiloxane and polydimethylsilmethylenedimethylsilane.

DESCRIPTION OF THE PREFERRED EMBODIMENTS

In its broadest aspect, the present invention is based upon the discovery of a polymer that should have a better solubility in carbon dioxide. That polymer is a polysilalkylenesilane polymer.

In one preferred embodiment of this invention, this polymer is used in a method for recovering oil from an underground oil-bearing earth formation penetrated by an injection well and a producing well. In that method, carbon dioxide is injected into the formation to displace the oil towards the producing well. The viscosity of the carbon dioxide that is injected into the formation is increased at least three-fold by the presence of a sufficient amount of a polysilalkylenesilane polymer and a sufficient amount of a cosolvent to form a solution of the polymer in the carbon dioxide. It is possible that, for some polysilalkylenesilane polymers, under some conditions of pressure and temperature, no cosolvent will be needed.

POLYMER

The polymer of the present invention is a polysilalkylenesilane polymer. Since this polymer has a lower solubility parameter than the polysiloxanes and polyvinylethers of Harris et al., it should be more soluble in carbon dioxide.

By "polysilalkylenesilane," we mean a polymer having a repeating unit that has, in its backbone, a saturated, alkylene group between two silicon atoms, with each silicon atom having two pendant alkyl groups. The four pendant alkyl groups can be either the same or different.

The chemical formula of the repeating unit of polysilalkylenesilane is:

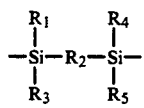

where $R_1$, $R_3$, $R_4$, and $R_5$ are alkyl groups, and $R_2$ is an alkylene.

Preferably, $R_1$, $R_3$, $R_4$, and $R_5$ are either methyl or ethyl, more preferably, methyl. Preferably, $R_2$ is either methylene or ethylene.

The structures of the repeating units of the preferred polymers are shown in the table below:

TABLE OF PREFERRED POLYMERS

| Repeating Unit | Polymer | Estimated Solubility Parameter $(J^{\frac{1}{2}}/cm^{3/2})$ |
|---|---|---|
| $-Si(CH_3)_2-CH_2-Si(CH_3)_2-$ | polydimethylsilmethylenedimethylsilane | 13.6 |
| $-Si(CH_3)_2-CH_2-CH_2-Si(CH_3)_2-$ | polydimethylsilethylenedimethylsilane | 13.9 |
| $-Si(CH_2CH_3)(CH_3)-CH_2-Si(CH_3)_2-$ | polymethylethylsilmethylenedimethylsilane | 13.9 |
| $-Si(CH_3)_2-CH_2-CH_2-CH_2-Si(CH_3)_2-$ | polydimethylsilpropylenedimethylsilane | 14.2 |
| $-Si(CH_2CH_3)_2-CH_2-Si(CH_3)_2-$ | polydiethylsilmethylenedimethylsilane | 14.2 |
| $-Si(CH_2CH_3)(CH_3)-CH_2-CH_2-Si(CH_3)_2-$ | polymethylethylsilethylenedimethylsilane | 14.2 |
| $-Si(CH_2CH_3)(CH_3)-CH_2-Si(CH_2CH_3)(CH_3)-$ | polymethylethylsilmethylenediethylsilane | 14.5 |
| $-Si(CH_2CH_3)_2-CH_2-Si(CH_2CH_3)_2-$ | polydiethylsilmethylenediethylsilane | 14.6 |

Most preferably, the polymer is either polydimethylsilmethylenedimethylsilane, polydimethylsilethylenedimethylsilane, or polymethylethylsilmethylenedimethylsilane. Those three polymers have estimated solubility parameters of 13.6, 13.9, and 13.9, respectively, as compared to polydimethylsiloxane, which has an estimated solubility parameter of 15.3.

The preparation of polysilalkylenesilanes is well known in the art. For instance, W. Noll, Chemistry and Technology of Silicones, Academic Press, Orlando, 1968, p 365, 368; H. Clark, U.S. Pat. No. 2,563,094; and H. CLARK, U.S. Pat. No. 2,563,004. U.S. Pat. Nos. 2,563,094 and 2,563,004 are hereby incorporated by reference for all purposes.

In another embodiment, the polymer can be a copolymer having a silalkylenesilane repeating unit and a siloxane repeating unit. By "copolymer" we mean a polymer having more than one type of repeating unit. The repeating units of the copolymer can be incorporated either randomly, regularly, in blocks, as grafts, or combinations thereof. By "randomly" we mean that the silalkylenesilane and siloxane repeating units are attached to the backbone of the polymer in a disordered sequence (e.g., AABABBBAB, etc.). By "regularly" we mean that the silalkylenesilane and siloxane repeating units are attached to the backbone alternately (e.g., ABABABAB, etc.). By "in blocks" we mean that the silalkylenesilane and siloxane repeating units are attached in segments (e.g., AAABBBBBAA, etc.). By "graft" we mean that the silalkylenesilane or siloxane units are added as side chains (e.g., BBAAAAAABB).

The silalkylenesilane repeating units are more fully described above. Examples of suitable siloxane repeating units are shown in Harris et al., cited above, which is hereby incorporated by reference for all purposes. Preferably, the siloxane repeating unit is dimethylsiloxane. The preparation of useful copolymers is disclosed in W. Noll, Chemistry and Technology of Silicones, pg. 367.

CARBON DIOXIDE

The carbon dioxide can come from any suitable source, such as those described in "Miscible Displacement" by Fred I. Stalkup, Jr. (Monograph Vol. 8, Henry L. Doherty Series, ISBN NO895203197, Society of Petroleum Engineers, 1983, Chap. 8, sec. 8.4). Substantially pure carbon dioxide is preferred, but water-saturated carbon dioxide is acceptable since water (or brine) is usually present in the formation. Usually, the carbon dioxide contains at least 95% carbon dioxide and preferably at least 98% carbon dioxide, the remainder being usually light hydrocarbons. The amount of impurities in the carbon dioxide which can be tolerated is a function of the type of oil to be displaced and the type of displacement operation.

COSOLVENT

As a class, it would appear that many materials are suitable for use as cosolvents in this invention:
(a) alcohols having from 1 to 8 carbon atoms,
(b) aromatics having a single ring and from 6 to 10 carbon atoms,
(c) ketones having from 3 to 10 carbon atoms,
(d) carboxylic acid esters where the carboxylic acid portion has from 2 to 4 carbon atoms and the ester portion has from 1 to 10 carbon atoms,
(e) hydrocarbons having from 2 to 20 carbon atoms, including refinery streams such as naphthas, kerosene, gas oils, gasolines, etc., and
(f) ethers and gylcol ethers having from 2 to 10 carbon atoms.

If hydrocarbons are used, preferably they are aliphatic, naphthenic, or aromatic hydrocarbons having from 3 to 10 carbon atoms.

One technique for obtaining the desired cosolvent on-site is to contact the carbon dioxide in a liquid-liquid extraction apparatus with recovered crude or a fraction of such crude for a sufficient time to permit the carbon dioxide to extract enough light hydrocarbons to function as the cosolvent. The desired amount of polymer would then be added to the carbon dioxide-light hydrocarbon extract to form the oil-driving material.

The polymer-cosolvent-carbon dioxide mixture must be compatible with the formation fluids so that the polymer won't precipitate in the formation after injection.

AMOUNTS OF CARBON DIOXIDE, POLYMER, AND COSOLVENT

The new compositions of this invention preferably comprise from 70 to 99.9 weight percent carbon dioxide and a sufficient amount of a mixture of a polymer and a cosolvent to effect at least a three-fold increase in the viscosity of the carbon dioxide. Usually the weight percent polymer in the mixture is from 0.05 to 20 weight percent. The amount of cosolvent is at least sufficient to dissolve the desired amount of polymer in the carbon dioxide and is at least 40% by weight of the polymer employed. This amount of cosolvent is usually from 0.05 to 30 weight percent of the final mixture.

One method of preparing the viscous carbon dioxide solution is by forming a first solution of the polymer and cosolvent and then mixing carbon dioxide with the polymer-cosolvent solution. The viscous carbon dioxide is displaced through the formation by a drive fluid which is comprised of slugs of viscous carbon dioxide alternated with slugs of a fluid comprising water or reservoir brine.

While the present invention has been described with reference to specific embodiments, this application is intended to cover those various changes and substitutions which may be made by those skilled in the art without departing from the spirit and scope of the appended claims.

What is claimed is:

1. In a method for recovering oil from an underground oil-bearing earth formation penetrated by an injection well and a producing well, in which method carbon dioxide is injected into said formation to displace oil towards said producing well from which the oil is produced to the surface, the improvement comprising injecting into said formation carbon dioxide, the viscosity of which is increased at least three-fold by the presence of a sufficient amount of a polysilalkylenesilane polymer.

2. The method according to claim 1 wherein said polymer is polydimethylsilmethylenedimethylsilane.

3. The method according to claim 1 wherein said polymer is polydimethylsilethylenedimethylsilane.

4. The method according to claim 1 wherein said polymer is polymethylethylsilmethylenedimethylsilane.

5. The method according to claim 1 wherein a sufficient amount of a cosolvent is present in said carbon dioxide to form a solution of said polymer in said carbon dioxide.

6. The method according to claim 5 wherein the carbon dioxide solution comprises from 70 to 99.9 weight percent carbon dioxide; from 0.05 to 20 weight percent polymer; and from 0.05 to 30 weight percent cosolvent.

7. The method according to claim 5 in which said carbon dioxide solution is prepared by forming a first solution of said polymer and said cosolvent and then mixing carbon dioxide with said first solution.

* * * * *